April 28, 1942.  G. L. CAILLE  2,280,891
ROUTE CONTROL SYSTEM
Filed April 11, 1940   12 Sheets-Sheet 1
Fig. 1.
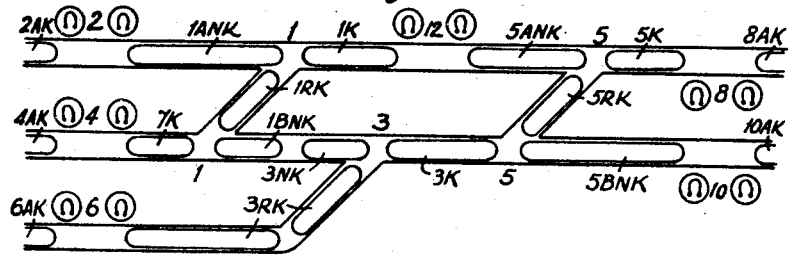
Fig. 2.
Fig. 3.
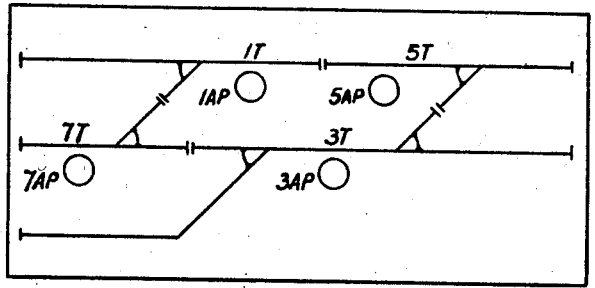
INVENTOR
Georges Louis Caille.
BY
HIS ATTORNEY.

April 28, 1942.　　　　G. L. CAILLE　　　　2,280,891
ROUTE CONTROL SYSTEM
Filed April 11, 1940　　　12 Sheets-Sheet 2

INVENTOR.
Georges Louis Caille.
BY
HIS ATTORNEY.

April 28, 1942.  G. L. CAILLE  2,280,891
ROUTE CONTROL SYSTEM
Filed April 11, 1940  12 Sheets-Sheet 3

INVENTOR.
Georges Louis Caille.
BY
HIS ATTORNEY.

April 28, 1942.  G. L. CAILLE  2,280,891
ROUTE CONTROL SYSTEM
Filed April 11, 1940  12 Sheets-Sheet 4

INVENTOR
Georges Louis Caille.
BY
HIS ATTORNEY.

April 28, 1942.   G. L. CAILLE   2,280,891
ROUTE CONTROL SYSTEM
Filed April 11, 1940   12 Sheets-Sheet 5

INVENTOR
Georges Louis Caille
BY
HIS ATTORNEY.

April 28, 1942.  G. L. CAILLE  2,280,891
ROUTE CONTROL SYSTEM
Filed April 11, 1940    12 Sheets-Sheet 6
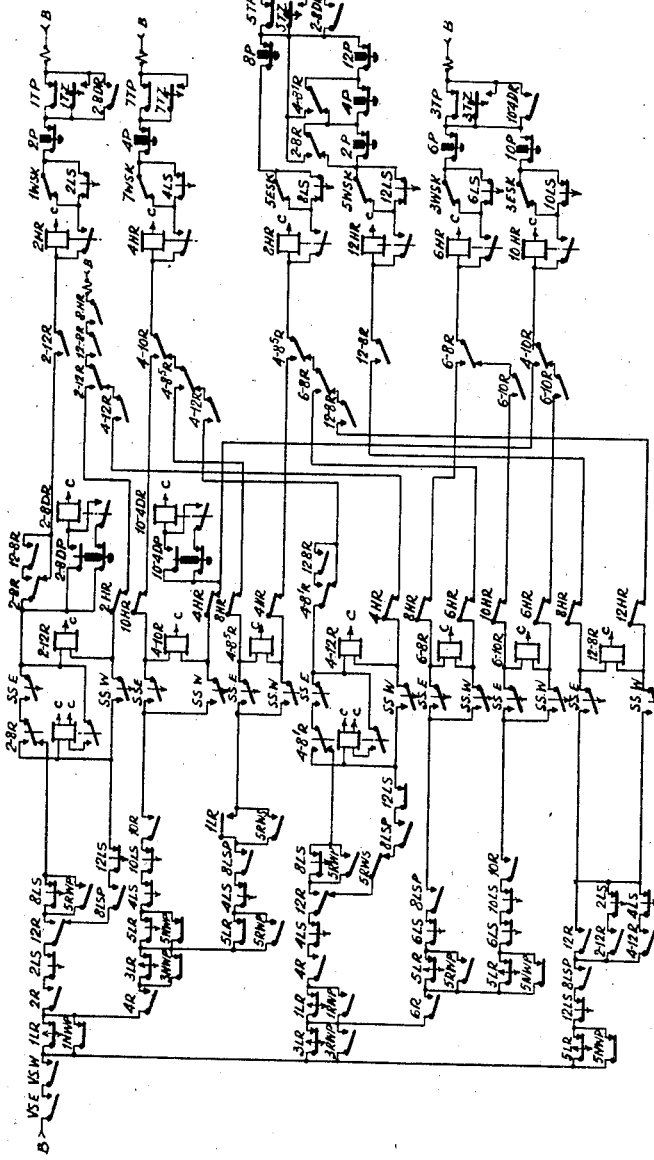
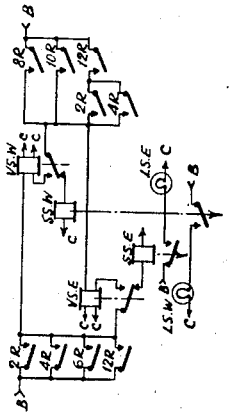
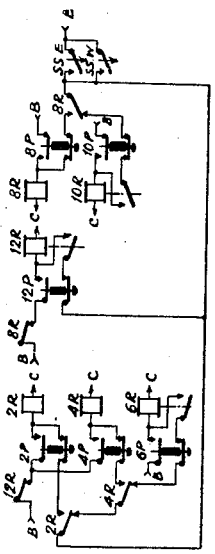
INVENTOR
Georges Louis Caille.
BY
HIS ATTORNEY.

April 28, 1942.  G. L. CAILLE  2,280,891
ROUTE CONTROL SYSTEM
Filed April 11, 1940     12 Sheets-Sheet 7

INVENTOR
Georges Louis Caille.
BY
HIS ATTORNEY.

April 28, 1942.　　　　G. L. CAILLE　　　　2,280,891
ROUTE CONTROL SYSTEM
Filed April 11, 1940　　　12 Sheets-Sheet 8

*INVENTOR.*
*Georges Louis Caille.*
BY
*HIS ATTORNEY.*

April 28, 1942.　　　　G. L. CAILLE　　　　2,280,891
ROUTE CONTROL SYSTEM
Filed April 11, 1940　　　12 Sheets-Sheet 9

INVENTOR.
Georges Louis Caille.
BY
HIS ATTORNEY.

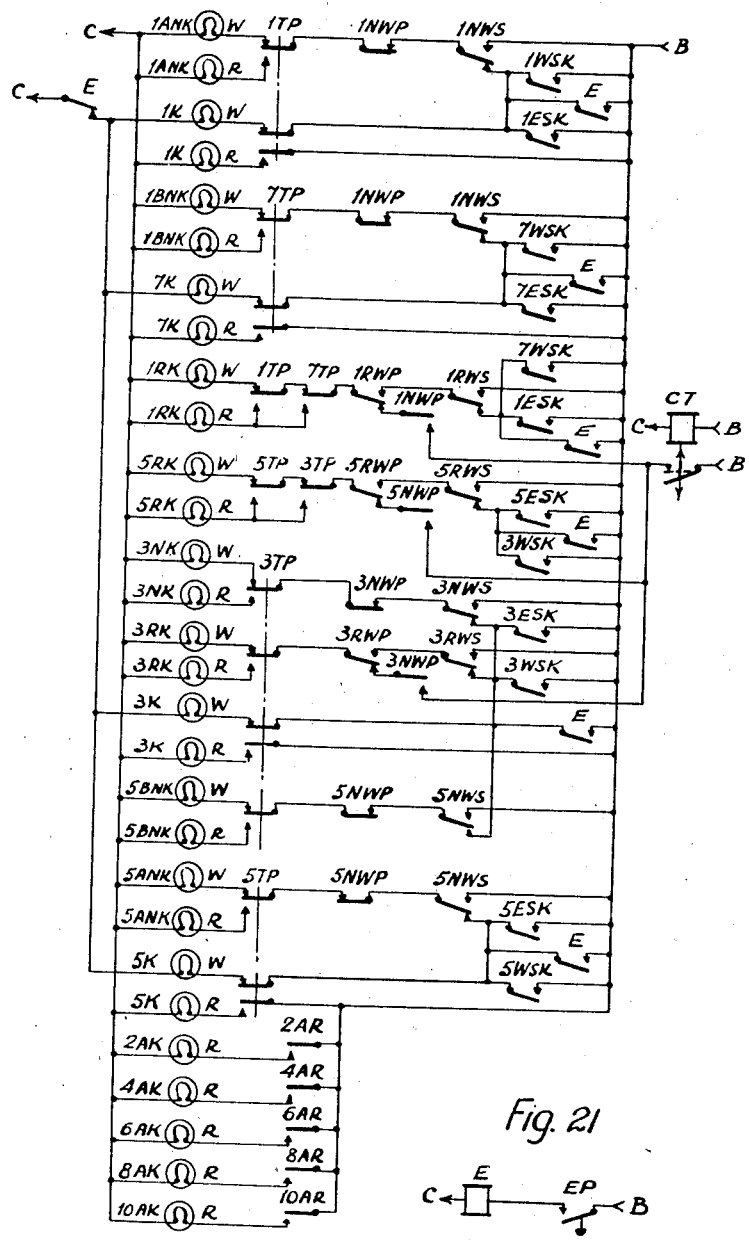

April 28, 1942.   G. L. CAILLE   2,280,891
ROUTE CONTROL SYSTEM
Filed April 11, 1940   12 Sheets-Sheet 12

*INVENTOR*
*Georges Louis Caille.*
BY
*HIS ATTORNEY.*

Patented Apr. 28, 1942

2,280,891

UNITED STATES PATENT OFFICE 2,280,891

ROUTE CONTROL SYSTEM

Georges Louis Caille, Vaujours, France, assignor, by mesne assignments, to The Union Switch & Signal Company, Swissvale, Pa., a corporation of Pennsylvania Application April 11, 1940, Serial No. 329,134
In France October 27, 1939

17 Claims. (Cl. 246—134)

The present invention relates to railway signalling systems, and more particularly, to interlocking control systems of the type in which a complete track route between two points of a railway track layout is established by a relatively simple operation without special attention by the signalman to the setting of the individual track switches involved, and is a further development of the system described in Letters Patent of the United States No. 2,247,801, issued July 1, 1941, upon a United States application filed July 26, 1939, by G. L. Caille and A. P. Laze, for Signalling and interlocking system for traffic routes, corresponding to the French application 440,503 of January 14, 1939, hereinafter referred to as the "main patent."

The present invention has for one of its objects to increase the safety of the system described in the main patent and for this purpose arrangements are, for example, provided in order to secure that the initial control operation by which a route relay is picked up is terminated after a relatively short time, independently of whether or not the signalman releases the control button or buttons which had to be pressed in order to establish a route.

The further objects of the invention comprise facilitating the operation of establishing traffic routes over the various tracks of a track layout which is protected by entrance and exit signals. A still further object is to facilitate the emergency control operations if faulty condition of a track circuit necessitates temporary cancellation of the track circuit control of certain sections. Apart from that, arrangements will be described which permit the utilization of the two-button entrance-exit control of a route, that is to say an operation according to which a route is set up by pressing two buttons in succession, one button being associated with each point of the lay-out at which a route may begin or end.

In order that the further developments and improvements may be more readily understood, particulars of the contemplated system will now be described with reference to the accompanying drawings in which:

Figure 1, being identical with Figure 1 of the main patent, shows one form of illuminated track diagram, Figure 2 shows a suitable control panel provided with individual route buttons P, which has also been shown in the main patent.

Figure 3, being identical with Figure 3 of the main patent, shows an emergency release panel for effecting the emergency release of the detector locking in the event of the failure of a track circuit.

Figure 4:
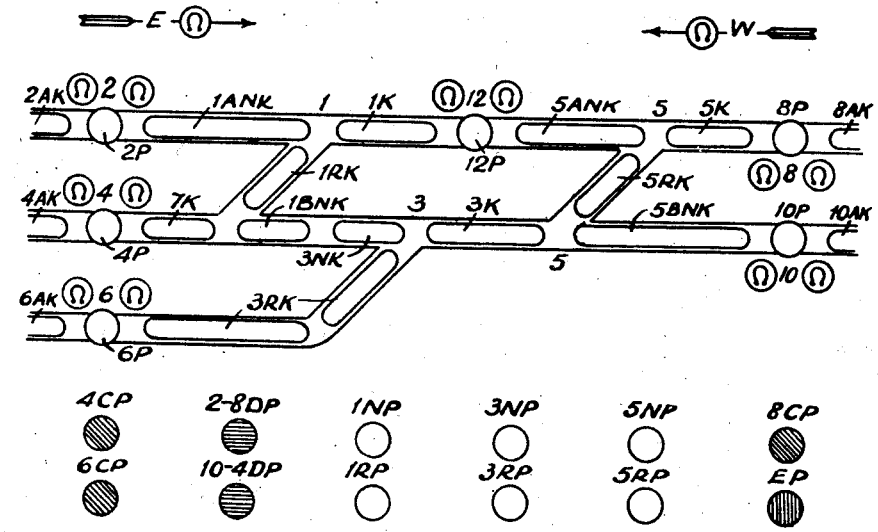
Figure 4 shows a combined control panel and illuminated diagram for a modified system having so-called entrance-exit control.
Figure 6:
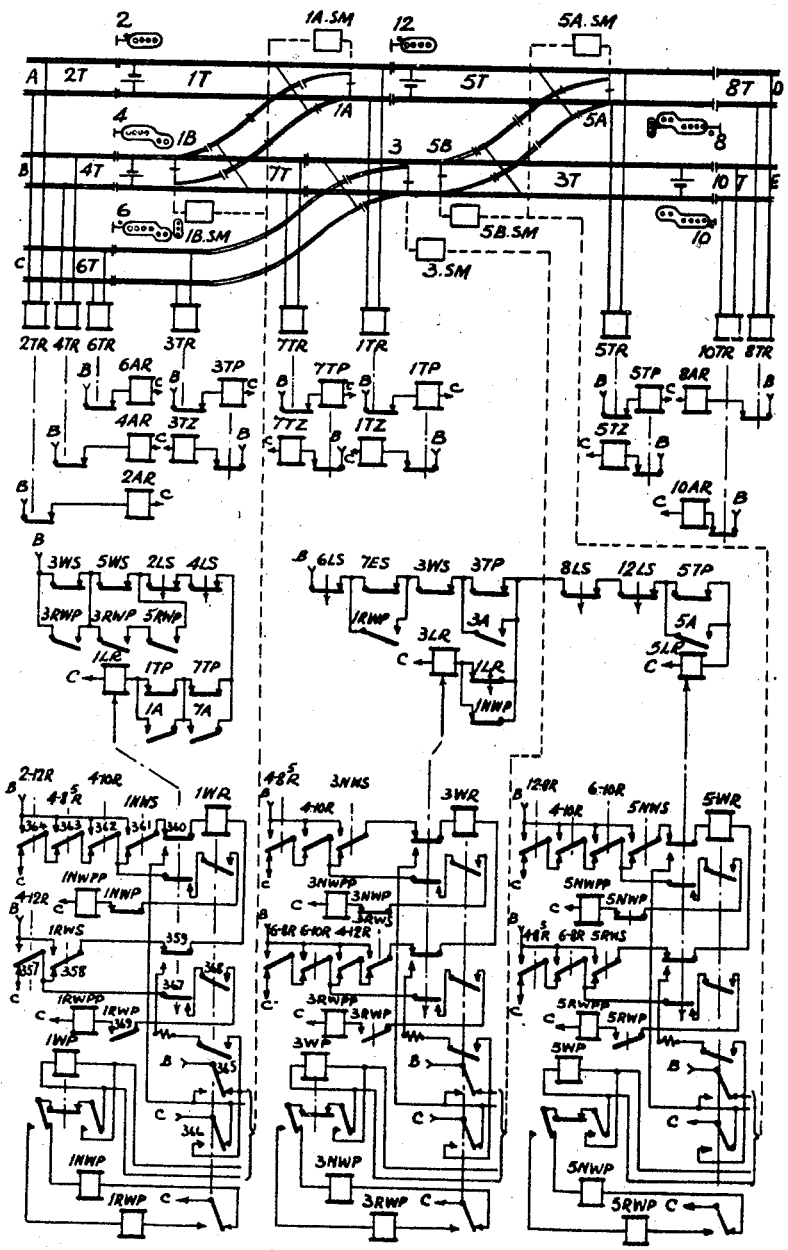

Figure 6 shows in its upper portion, a track plan illustrating the arrangement of the tracks of the layout to be controlled, together with the circuits for the track relays TR and repeating relays controlled thereby, and in its lower portion, the circuits for the switch control relays WR, the switch indication relays WP, and the switch locking relays LR, and is a modification of Figure 4 of the main patent.

Figure 5:
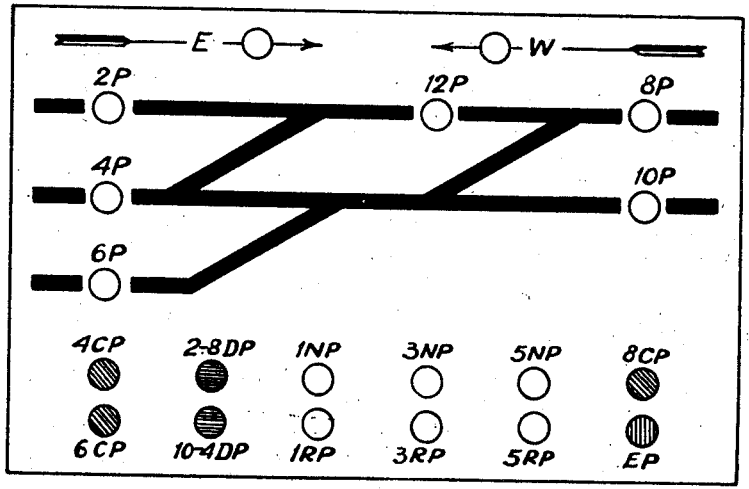
Figure 5 shows a control panel of similar type provided with a non-illuminated track diagram which is particularly suitable for large installations in which it would be inconvenient to distribute the control buttons over an illuminated diagram.
Figure 7:
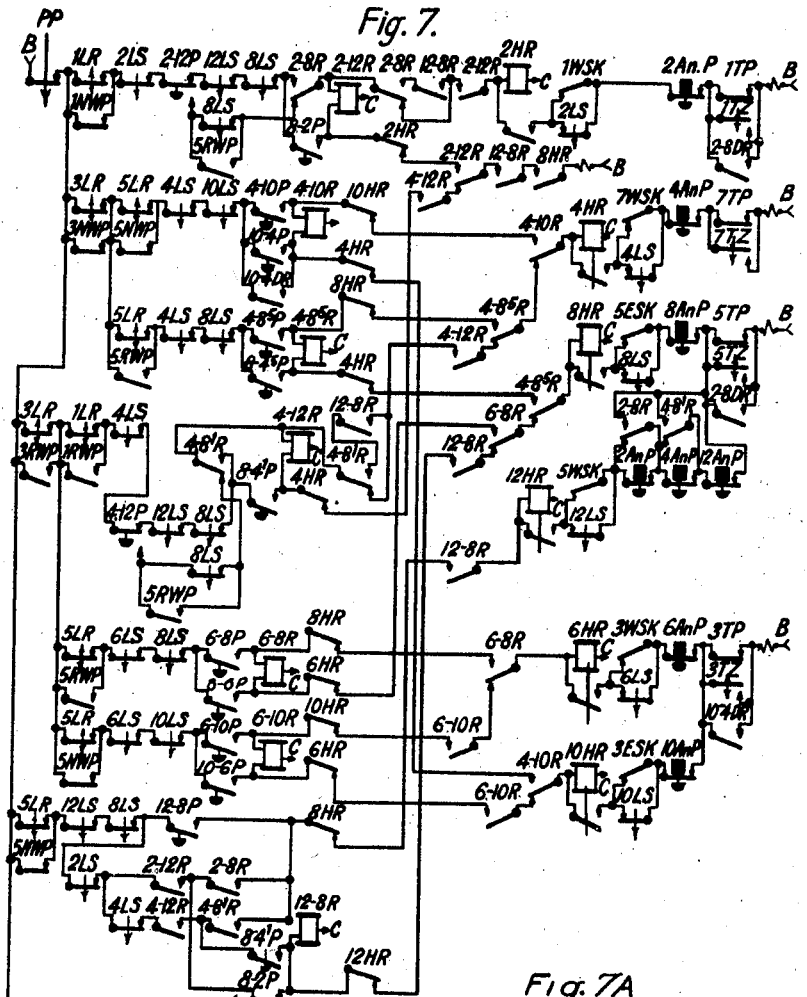

Figure 7 shows the control of route relays R and signal control or preparation relays HR by the buttons P of Fig. 2, for a system in which one button is provided for each route, and is a modification of Figure 5 of the main patent.

Figure 7A:
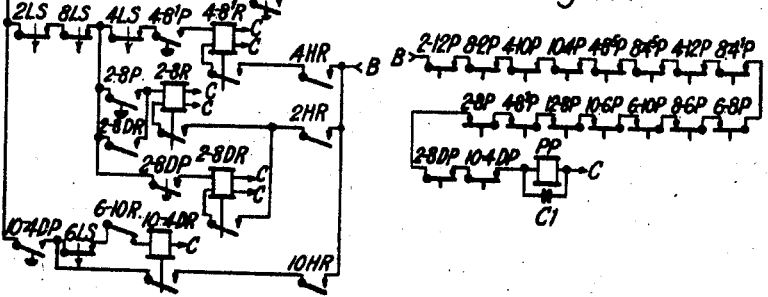

Fig. 7A shows the circuit for a slow-release relay PP for controlling the circuits of Fig. 7.

Figure 8:
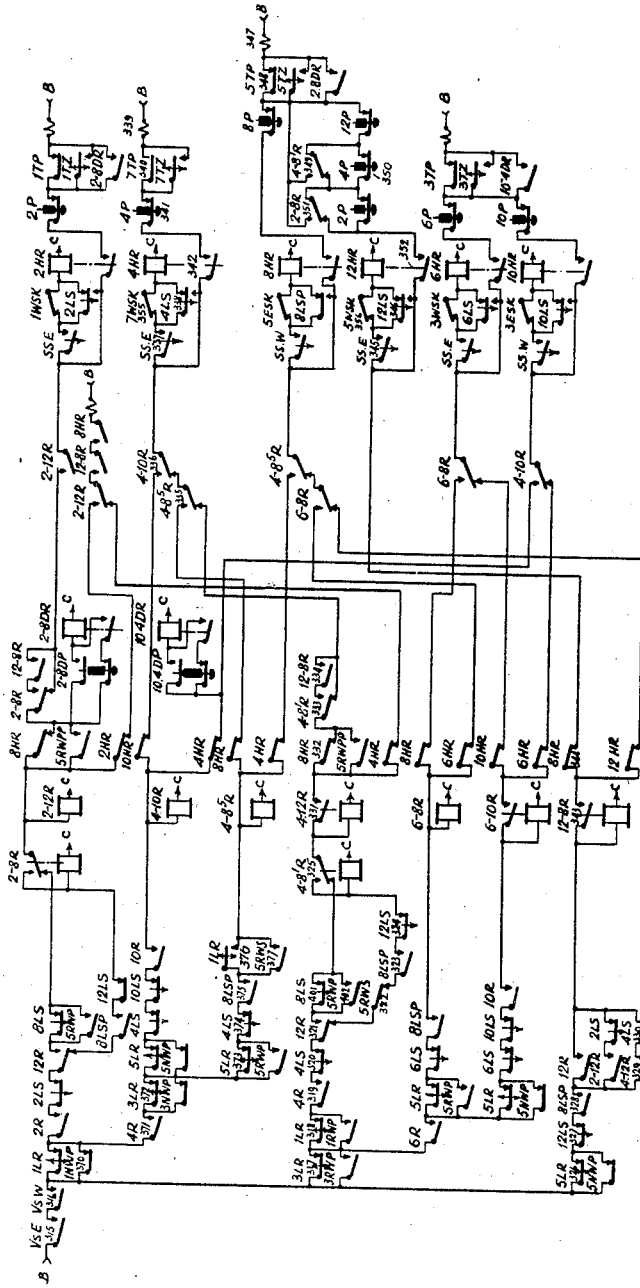
Figure 8B:
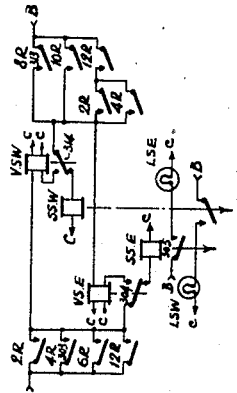
Figure 8A:
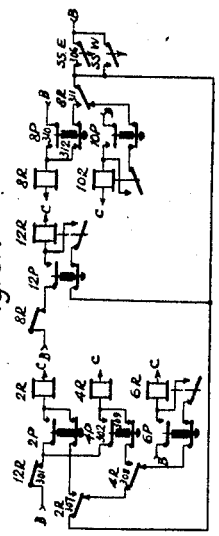

Figure 8 may be considered as another modification of the same figure of the main patent and shows, together with Figures 8A and 8B, the control of the route relays R and signal preparation relays HR by the buttons P of Fig. 4 or 5, arranged for entrance-exit control in accordance with the present invention.

Figure 9 together with Figures 9A and 9B is a similar diagram of a modified form of the present invention.

Figure 10:
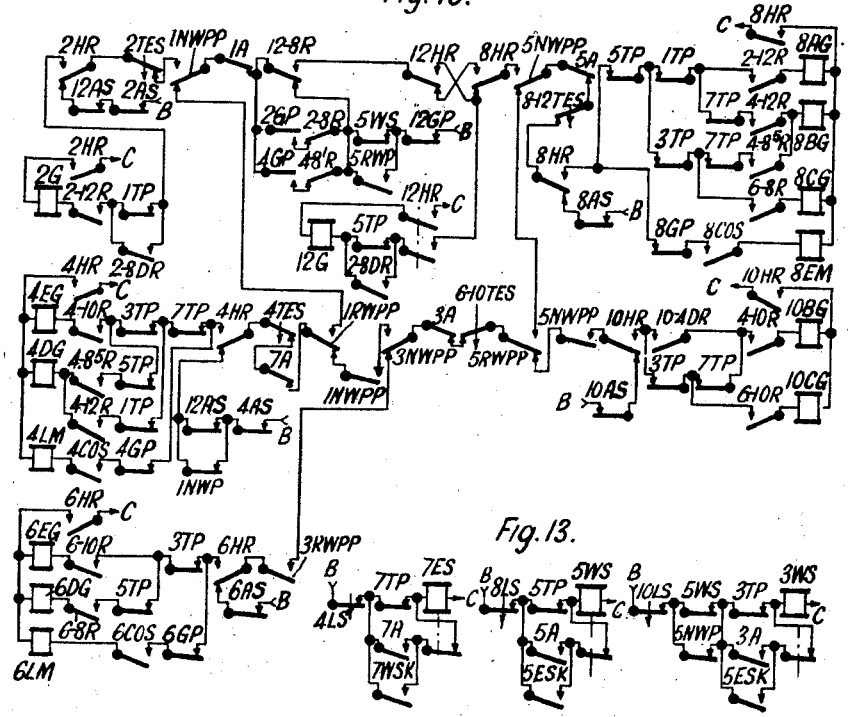

Figure 10, being a modification of Figure 6 of the main patent, shows the control of the main signal clearing relays G and of the call-on signal relays M.

Figure 11:
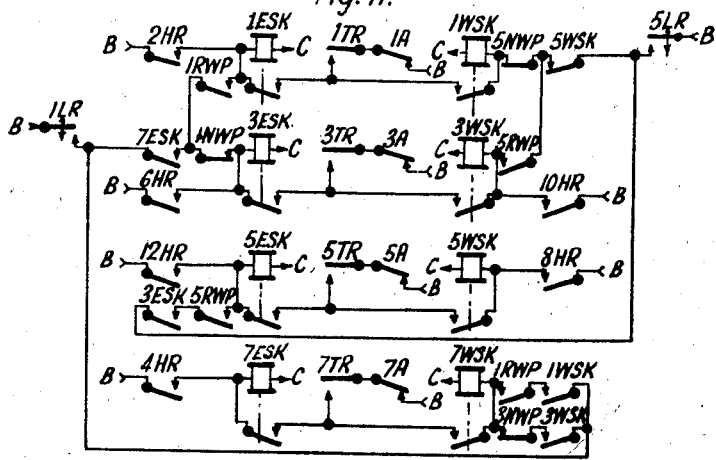

Figure 11, being a modification of Figure 8 of the main patent, shows the control of direction-detector relays ESK and WSK provided primarily for controlling the lighting of the illuminated track diagram, but also employed for other purposes as hereinafter described.

Figure 12:
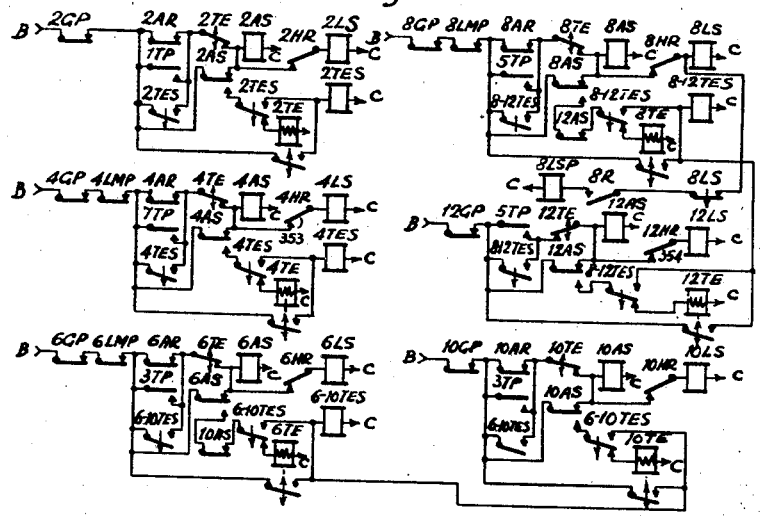

Figure 12 is a modification of Figure 9 of the main patent and shows the approach locking relays LS and auxiliary relays AS, together with the usual time element relays TE and stick relays TES associated therewith.

Figure 13:
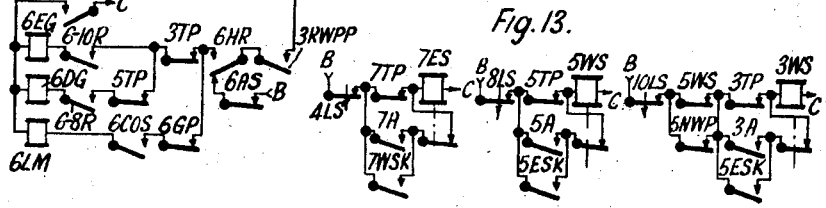
Figures 14, 15:
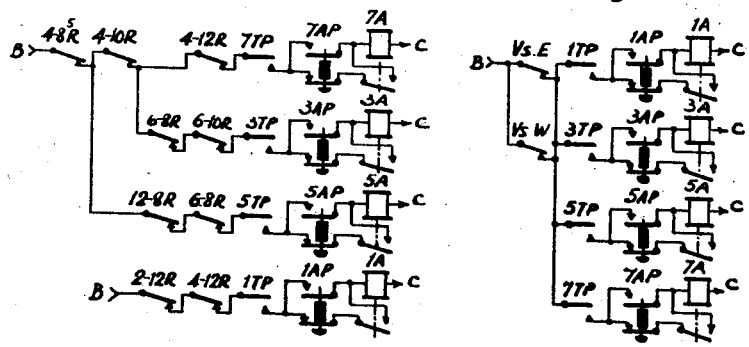

Figure 13 (modification of Figure 10 of the main patent), shows the control of directional section locking relays ES and WS, Figures 14 and 15 (modification of Figure 11 of the main patent) show two forms of circuits for the emergency release relays A controlled by the buttons AP of Fig. 3.

Figure 14 being intended for single-button route control, and

Figure 15 being intended for two-button entrance-exit control.

Figure 16:
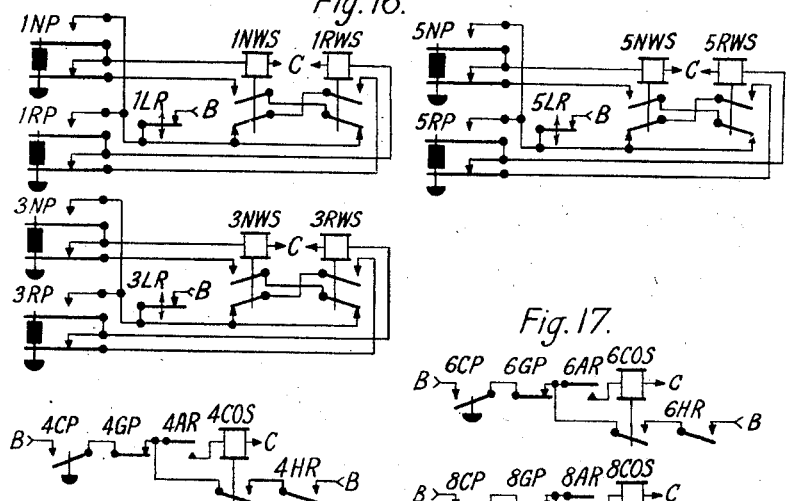

Figure 16 (identical with Figure 13 of the main patent) shows apparatus for operating the track switches individually, comprising the normal and reverse switch stick relays NWS and RWS controlled by the buttons NP and RP of Figs. 2, 4 or 5.

Figure 17:
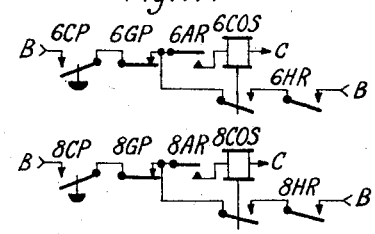

Figure 17 (modification of Fig. 14 of the main patent) shows circuits for the call-on stick relays COS controlled by the buttons CP of Figs. 2, 4 or 5.

Figure 18:
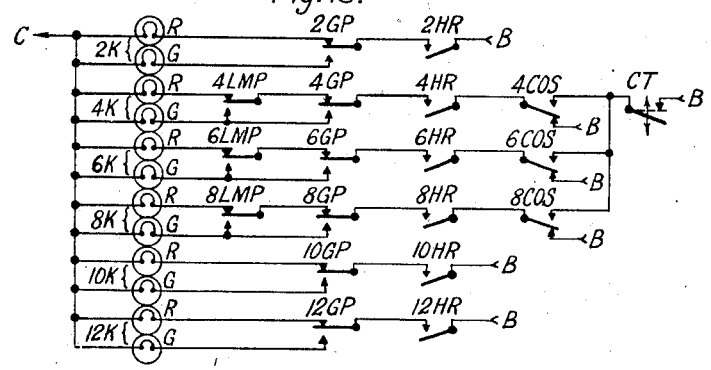
Figure 19:
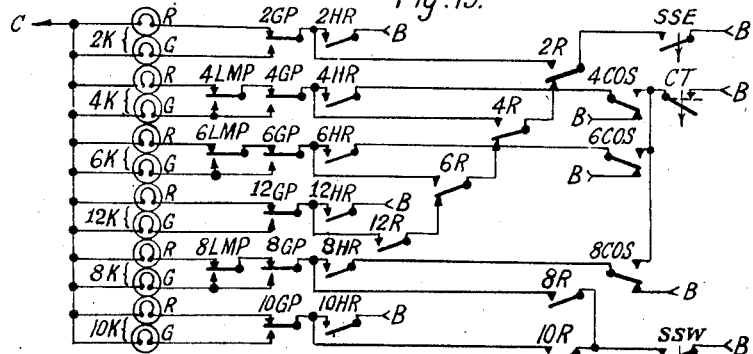

Figures 18 and 19 (modifications of Figure 15 of the main patent) show the control of the red and green signal-indication lamps for single and two-button route control respectively, these lamps being mounted at the corresponding signal locations in the track diagrams of Figs. 1 and 4.

Figure 20 (modification of Figure 16 of the main patent) shows the control of the red and white lamps for illuminating the track portions of Figs. 1 and 4.

Figure 21 (identical with Figure 17 of the main patent) shows the control for a relay E, by means of which the switch indication lamps of Fig. 20 may be lighted to indicate the positions of the track switches even though no route is set up.

Figure 22:
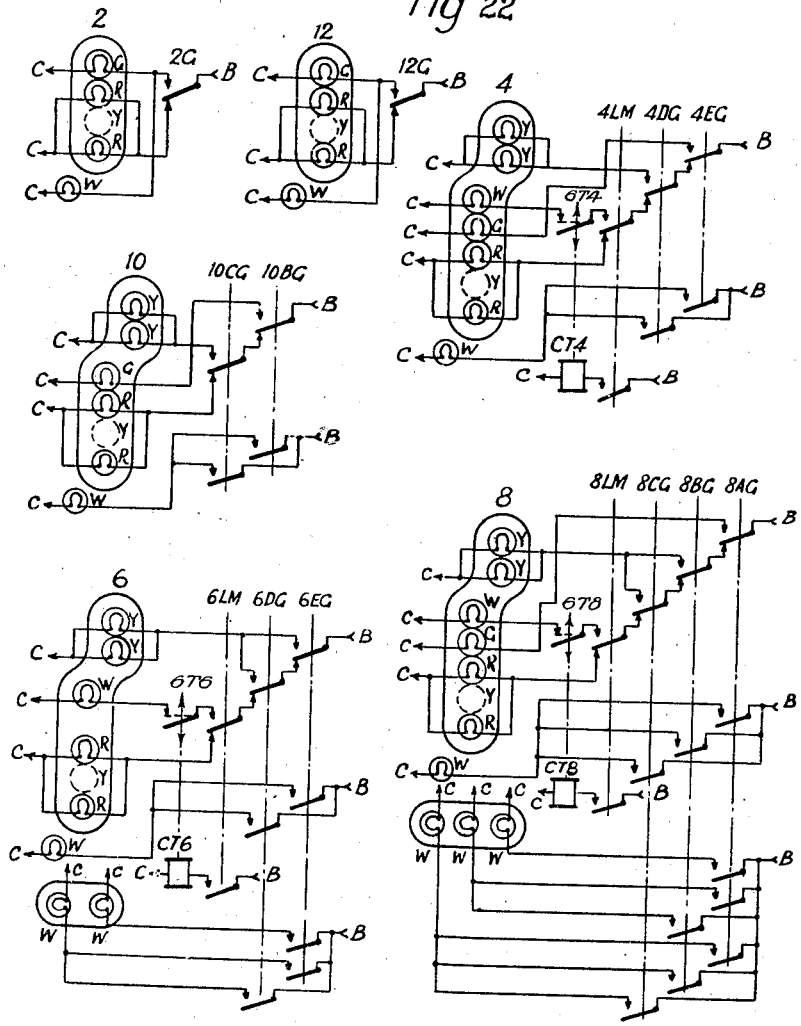

Figure 22 (identical with Figure 18 of the main patent) shows the lighting circuits for the various signals provided along the tracks of Fig. 6.

Figure 23:
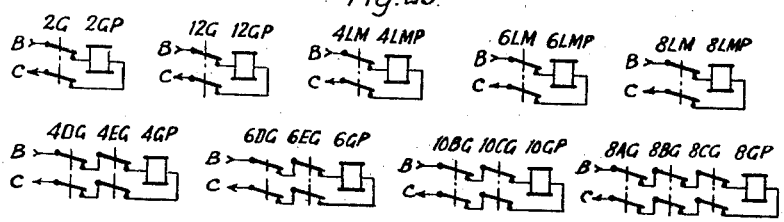

Figure 23 (identical with Figure 19 of the main patent) shows the operation of signal-at-stop check relays GP and MP.

Figure 24:
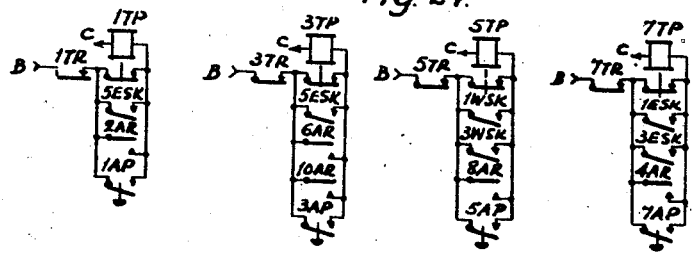

Figure 24 (sheet 8) shows direction-detector track-repeater control for preventing release of the locking in the event of the imperfect shunting of a track circuit.

Figure 25:
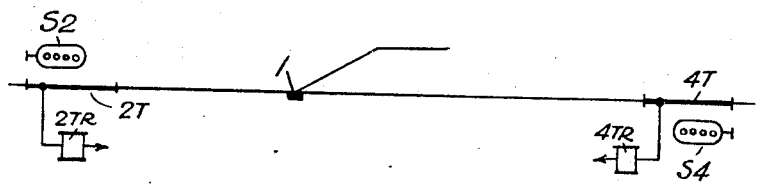
Figure 25A:
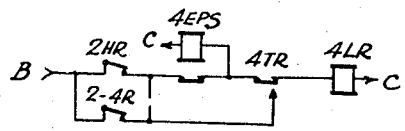
Figure 25B:
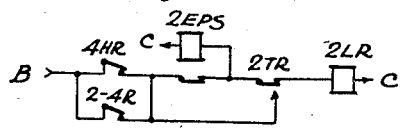
Figure 25C:
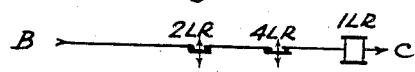

Figure 25 illustrates the circuits for an installation including non-insulated track sections (together with Figures 25A, 25B, 25C).

Where the application to single button or two-button route-control is not mentioned, the circuits indicated in the figures are applicable to either system.

The single-button route-control having been described in detail in the main patent, and the modifications applied thereto according to the present invention being relatively slight, the single-button control will not be described in detail, but reference is made to the corresponding description in the main patent while certain distinguishing features will be pointed out in the following, partly while describing the two-button control. Figures 1, 2 and 3 being identical with the corresponding figures of the main patent do not require any additional description.

If it is desired to control the operation according to the so-called entrance-exit system the illuminated track diagram and panel illustrated in Figures 1 and 2, respectively, are preferably replaced by a combined illuminated track diagram and control panel as illustrated in Figure 4. It will be seen from this diagram that route-end buttons 2P, 4P, 6P, 8P, 10P and 12P are provided on the track diagram at various points at which a route may begin or end, the diagram being further distinguished from that shown in Figure 1 by the addition of a pair of illuminated direction indicators E and W while emergency switch control buttons INP, IRP, etc., call-on buttons 4CP, 6CP, 8CP, and an illumination button EP are provided in two rows below the diagram.

In respect to the control of the direction indicators, the present invention is an improvement upon that disclosed in Letters Patent of the United States, No. 2,217,909, issued October 15, 1940, to C. H. Lay, for Railway traffic controlling apparatus.

In installations comprising a complicated track lay-out, the illuminated track diagram may assume such large dimensions as to make it inconvenient for the signalman to set up a route by means of press buttons arranged on this diagram in the manner illustrated in Figure 4. In such cases these buttons are preferably mounted on a desk of relatively small dimensions having a simplified non-illuminated track diagram as illustrated in Figure 5, in which only the tracks are shown by black lines and, apart from the buttons, only two lamps indicating the direction for which a route is set up are provided.

Figure 6 shows the arrangements of the track switches, signals, and track relays, in their arrangement relative to the actual track lay-out and the control of track-repeater, switch control, switch locking and switch indication relays, and it should be noted that the track repeater relays TP and switch locking relays LR are provided with delayed-release characteristics in order to increase the safety of the system.

The main difference between the individual route button system illustrated in Figure 7 and the control of the route relays according to Figure 5 of the main patent consists in the fact that a contact of a relay PP, which is controlled in the manner illustrated in Figure 7A, is included in the supply wire leading to terminal B. From Figure 7A it will be evident that relay PP will be released after the expiration of its delay period, when any of the route press buttons 2—12P, 8—2P, etc., is pressed and held down. It will thus be obvious that the pick-up circuit for each route relay will be interrupted after a relatively short period either by the release of the associated route press button or, should the route press button be kept down by the signalman, owing to the fact that relay PP releases its armature thus interrupting the supply from terminal B.

The release period of the relay PP is adjusted to be about one second, which is amply sufficient for permitting a route relay to be picked up.

It follows therefore that the buttons are not effective to control the route relays unless they are operated at a time when the route relays are responsive, that is to say, when the desired routes are available, and the buttons cease to be effective if held operated materially longer than required.

Referring now to Figures 8, 8A, and 8B, illustrating the route circuits for the entrance-exit system, it will be seen that the setting up of a route is effected in two steps, the first being the selection of the required route relay and the second the actual setting up of the route. The selection is effected by repeater relays R for the route-end buttons which control a direction-selector relay SSE for the eastbound and SSW for the westbound direction, direction-locking relays VSE and VSW being also provided.

The automatic interruption of the pick-up circuits of the route relays which is realised both in the case of the route control by a single press-button as illustrated in Figure 7 and in the case of entrance-exit control as illustrated in Figures 8 and 9, offers the great advantage that no manual cancellation is required should accidentally the signalman try to set up a route which would conflict with a route which has previously been set up and not yet dissolved by the passage of a train or manual cancellation.

Referring now again to Figures 8A and 8B and assuming that it is intended to set up an eastbound route from signal 4 to signal 8 via crossover I reversed, the signalman will press in succession first press-button 4P and then press-button 8P.

On actuation of press button 4P the route-end-button repeater relay 4R is temporarily energised through a circuit comprising terminal B, back contact 301 of button-repeater relay 12R, front contact 302 of press button 4P, winding of relay 4R and return wire C.

Relay 4R when energised completes a circuit (Figure 8B) for energising a slow release direction-selector relay SSE, through a circuit including terminal B, front contact 303 of relay 4R, back contact 304 of direction-locking relay VSE, winding of direction-selector relay SSE, and return wire C. The energisation of relay SSE completes an obvious circuit for the illumination of lamp LSE for the direction-indicator E on the control panel, thus indicating that an eastbound route is being set up.

At the same time direction locking relay VSW is energised over contact 303 of relay 4R in an obvious manner so as to isolate the westbound slow release direction-selector relay SSW at its back contact 314.

The picking up of the eastbound selector relay SSE completes a stick circuit for button-repeater relay 4R (Figure 8A) from terminal B through front contact 306 of direction selector relay SSE, back contact 307 of button-repeater relay 2R, front contact 308 of relay 4R, normal contact 309 of press button 4P, winding of relay 4R to return wire C.

The subsequent pressing of route-end button 8P will energise a repeater relay 8R through front contact 310 of press button 8P, and this relay 8R will be held in its energised position through a circuit leading from terminal B through front contact 306 of eastbound direction-selector relay SSE, front contact 311 of relay 8R, normally closed contact 312 of press button 8P, and winding of relay 8R, to terminal C.

Front contact 313 (Figure 8B) of relay 8R completes an obvious circuit for the energisation of direction-locking relay VSE and, as direction-locking relay VSW is picked up owing to the energisation of relay 4R, a second circuit for keeping relay VSW picked up is established through terminal B, front contact 313 of relay 8R, front contact 314 of relay VSW, second winding of relay VSW and terminal C.

The picking up of direction-locking relay VSE cuts the energisation circuit of eastbound direction-selector relay SSE at back contact 304, and relay SSE will thus drop after its release period and thus, by opening its front contact 306, cut the stick circuits for the two route-end-button repeater relays 4R and 8R, which in their turn will cut off direction-locking relays VSE and VSW so that the whole contemplated part of the control system will return to normal, and the direction indicator lamp LSE will be extinguished.

The time until direction-selector relay SSE drops will in practice be arranged to be about one second and a half. It will be evident from the drawings that, should the signalman continue to press buttons 4P and 8P, direction-selector relay SSE will nevertheless be released while only relays 4R, 8R, VSE and VSW will remain picked up. It may be remarked that one each of the direction relays SSE, SSW, VSE and VSW will generally be sufficient for the whole system except in very large and complicated track lay-outs.

During the time when relays 4R, 8R, VSE and VSW are energised and relay SSE has not yet dropped, the route relay 4—8¹R will be energised through the following circuit; terminal B, front contact 315 of direction-locking relay VSE, front contact 316 of direction-locking relay VSW, front contact 317 of switch locking relay 3LR, front contact 318 of switch locking relay 1LR, front contact 319 of press-button repeater relay 4R, front contact 320 of approach-locking relay 4LS, back contact 321 of press-button repeater relay 12R, back contact 322 of emergency-control-button repeater relay 5RWS, front contact 323 of a switch locking and route repeater relay 8LSP for approach-locking relay 8LS and press-button repeater relay 8R, front contact 324 of approach-locking relay 12LS, winding of relay 4—8¹R, and terminal C. It will, for example, be noticed in the case of the repeater relay 8LSP (Fig. 12) that this relay combines, in this particular case, the functions of approach-locking relay 8LS and press-button repeater relay 8R; thus the utilisation of a relay such as 8LSP permits, which is desirable in important station layouts, to obtain a substantial saving in the number of contacts employed in the route circuits. Had button 12 instead of button 8 been pressed by the signalman in order to establish a route from 4 to 12, which forms part of the route from 4 to 8 via crossover I reversed, route relay 4—12R would have been energised in a similar manner through a circuit to that just traced from terminal B up to front contact 320 of relay 4LS and thence through front contact (instead of back contact) 321 of press-button repeater relay 12R, front contact 401 of approach-locking relay 8LS, back contact 325 of route relay 4—8¹R, winding relay 4—12R, and terminal C.

Referring now again to the setting-up of the route from 4 to 8 via I reversed, the picking up of route relay 4—8¹R completes another circuit for the energisation of route relay 4—12R which is identical with the circuit for energising relay 4—8¹R up to front contact 324 of approach-locking relay 12LS, then continuing through front contact 325 of relay 4—8¹R and winding of relay 4—12R to terminal C.

A circuit is now completed for the energisation of the route relay 12—8R controlling the second part of the route from 4 to 8 via I reversed, this circuit leading from terminal B through front contact 315 of direction-locking relay VSE, front contact 316 of direction-locking relay VSW, front contact 326 of switch locking relay 5LR, front contact 327 of approach-locking relay 12LS, front contact 328 of relay 8LSP, front contact 329 of route relay 4—12R, front contact 330 of approach-locking relay 4LS, winding of relay 12—8R to terminal C.

The two part route relays 4—12R and 12—8R in co-operation complete a circuit for the energisation of signal-preparation relay 4HR which is identical with the circuit for the energisation of relay 4—12R up to front contact 325 of route relay 4—8¹R, after which it passes through front contact 331 of part-route relay 4—12R, back contact 332 of preparation relay 8HR of the opposing signal, front contact 333 of route relay 4—8¹R, front contact 334 of part-route relay 12—8R, back contact 335 of route relay 4—8⁵R for the alternative route, back contact 336 of the conflicting route relay 4—10R, front contact 337 of the eastbound direction-selector relay SSE, front contact 338 of approach-locking relay 4LS, winding of relay 4HR and return wire C.

A stick circuit for signal-preparation relay 4HR includes terminal B, operating resistance 339, front contact 340 of track-repeater relay 7TP, normally closed contact 341 of press button 4P, front contact 342 of signal-preparation relay 4HR, front contact 337 of eastbound selector relay SSE, front contact 338 of approach-locking relay 4LS, winding of signal preparation relay 4HR, and return wire C.

At the same time the picking up of relay 12—8R completes a pick-up circuit for the signal-preparation relay 12HR which is identical with the energisation circuit of part-route relay 12—8R up to front contact 330 of approach-locking relay 4LS, from which it leads through front contact 343 of part-route relay 12—8R, back contact 344 of signal-preparation relay 8HR for the opposing signal, front contact 345 of direction-selector relay SSE, front contact 346 of approach-locking relay 12LS, winding of signal-preparation relay 12HR, and return wire C. The relay 12HR prepares its own stick circuit which leads from terminal B through resistance 347, front contact 348 of track repeater relay 5TP, front contact 349 of route relay 4—8¹R, normally closed contact 350 of press button 4P, back contact 351 of the conflicting route relay 2—8R, front contact 352 of signal-preparation relay 12HR, front contact 345 of direction-selector relay SSE, front contact 346 of approach-locking relay 12LS, winding of signal-preparation relay 12HR and return wire C.

Referring now to Figure 12 it will be seen that owing to the picking-up of the signal-preparation relays 4HR and 12HR, the energisation circuits of the approach locking relays 4LS and 12LS are cut at back contacts 353 and 354 respectively of relays 4HR and 12HR, and the approach-locking relays will therefore drop after their delay period which is about 0.7 seconds.

Referring now again to Figure 8 it will be seen that the pick-up circuits of route relays 4—8¹R, 4—12R and 12—8R and of signal-preparation relays 4HR and 12HR are now interrupted at front contacts 320, 324, 327, and 330 of approach locking relays 4LS and 12LS, but the signal-preparation relays are held by the stick circuits already described, and the route relays 4—8¹R, 4—12R, and 12—8R are also held by stick circuits.

The stick circuit of route relay 4—12R includes terminal B resistance 339, front contact 340 of track repeater relay 7TP, normally closed contact 341 of press button 4P, front contact 342 of signal preparation relay 4HR, back contact 336 of conflicting route relay 4—10R, back contact 335 of the route relay 4—8⁵R for the alternative route, front contact 334 of route relay 12—8R, front contact 333 of route relay 4—8¹R, back contact 332 of the signal preparation relay 8HR for the opposite direction, stick contact 331 of relay 4—12R, winding of the relay 4—12R and return wire C, and the stick circuit of relay 4—8¹R is identical except that from front contact 331 of relay 4—12R the current goes through stick contact 325 of relay 4—8¹R, and the winding of the latter relay to return wire C; the stick circuit for the part route relay 12—8R is identical with the previously described stick circuit for the signal-preparation relay 12HR up to front contact 352 of the latter, from which the current passes through back contact 344 of signal preparation relay 8HR for the opposite direction, front contact 343 of part route relay 12—8R, winding of the latter relay to return wire C.

Another stick circuit for the relay 4HR has to be provided since direction-selector relay SSE drops after a short interval. This second stick circuit for the signal preparation relay 4HR is provided by the fact that approach locking relay 4LS has been released in the above described manner, and is identical with the first stick circuit of the same relay 4HR as described further above up to front contact 342 of the relay 4HR, from which point the current can now pass through back contact 338 of approach-locking relay 4LS, back contact 355 of a direction detector relay 7WSK, winding of relay 4HR and return wire C.

The arrangement should be such that the two stick circuits for relay 4HR overlap in operation, that is to say the delay of the release of direction selector relay SSE should be sufficient so that the latter relay is still in its energised position in which its front contact 337 is closed when the second stick circuit for signal-preparation relay 4HR is completed.

The release of approach-locking relay 12LS simultaneously establishes a new stick circuit for signal-preparation relay 12HR which is identical with the above described first stick circuit for the same relay up to front contact 352 of relay 12HR from which the current finds now a path through back contact 346 of approach-locking relay 12LS, back contact 356 of direction detector relay 5WSK, winding of relay 12HR and return wire C, the establishment of this stick circuit also overlapping with the energisation of relay 12HR through the first stick circuit which includes front contact 345 of direction selector relay SSE.

The latter relay, as mentioned above, is released about one second and a half after its energisation, after which time it will cut the first stick circuit of the relays 4HR and 12HR at its front contacts 337 and 345, but the signal preparation relays 4HR and 12HR will remain energised through their second stick circuits which have just been described.

The fact that the second stick circuits include back contacts of the approach-locking relays 4LS and 12LS provides an absolute guarantee that the operation has been correctly carried out, as unless the approach-locking relays 4LS and 12LS are de-energised, the second stick circuit will not be completed, this also providing an additional safeguard that the route has been properly protected.

Referring now to Figure 9, it will be seen that the arrangement shown in this figure is generally similar to that shown in Figure 8 with the difference, however, that route relays with two windings are employed and that the pick-up circuit for the signal preparation relays does not include a contact of the direction detector relay. The operation is similar in general to that just described and will be readily understood from the drawings in connection with the foregoing description and the description of Figure 5 of the main patent.

Referring now again to the circuits for the switch machine et cetera illustrated in Figure 6, it will be seen that owing to the energisation of part route relay 4—12R, the polar switch control relay IWR is energised to its left-hand position through a circuit including terminal B, front contact 357 of part route relay 4—12R, back contact 358 of switch stick relay IRWS, front contact 359 of switch locking relay ILR, winding of relay IWR, front contact 360 of relay ILR, back contact 361 of switch stick relay INWS, back contact 362 of route relay 4—10R of a conflicting route, back contact 363 of the route relay 4—8⁵R for the alternative route, back contact 364 of route relay 2—12R of a conflicting route and return wire C.

While in the main patent, according to Figure 4, the control circuit for the switch machine included a neutral contact of switch control relay IWR, according to the present invention this circuit is directly controlled by the polar contacts of this relay in order to permit the switch machine to complete an operation once it is started, the control circuit of the motor comprising terminal B, polar contact 365 of relay IWR in its left-hand position, winding of the switch machine, polar contact 366 of the relay IWR in its left-hand position, and return wire C.

The stick circuit of the switch control relay IWR is similar to that described in the main patent and includes a neutral contact of relay IWR, this circuit being closed when the electric interlocking becomes effective, that is to say, after release of the switch locking relay ILR.

In order to save contacts in the control of the signals (see Figure 10) switch correspondence repeater relays NWPP, RWPP, are provided for repeating the positions of the route relays requiring the track switches to be normal and reverse respectively, and for also indicating the release of switch locking relay LR, the energisation of switch control relay WR and the fact that the switches are in the reverse or normal position corresponding to that of relay WR, the repeater relays being arranged to combine the positions of these various relays. These repeater relays are shown in Figure 6 and it will, for example, be observed that the energisation circuit for relay INWPP includes terminal B, one or the other of front contacts 364, 363 or 362 of route relays 2—12R, 4—8⁵R, and 4—10R, that is to say, for the routes which require that the crossover switches I should be at normal, a back contact of relay ILR, a front contact of the normal indication relay INWP, winding of relay INWPP and terminal C. Similarly, a circuit for IRWPP includes terminal B, front contact 357 of route relay 4—12R, back contact 367 of relay ILR, neutral front contact 368 of relay IWR, front contact 369 of reverse indication relay IRWP, winding of relay IRWPP and return wire C.

The operation of the switches 3 and 5 is similar to that of switches I and therefore need not be described in detail, but it may be mentioned that switches 3 are reversed in order to protect the route when route relay 4—12R is energized.

As mentioned above, the locking relays LR are provided with delayed-action characteristics, the period of time being about one second in picking up and about .7 second in releasing.

The delayed-pick-up feature has for its object to afford protection against a temporary mistake in switching and to counteract unlocking of the switches, while the delayed release feature permits, in case of faulty sections, the picking up of the route control with sufficient allowance, as is explained hereinafter in connection with Fig. 15.

Referring again to Figure 8, it may now be assumed that the track section IT is occupied or that switches I are locked in their normal position when it is intended to establish a route from 4 to 8.

In this case, the energisation circuit of the relays 4—8¹R and 4—12 is interrupted at front contact 318 of relay ILR, and as the reverse indication relay IRWP is released, the points switches I are locked in normal position, for example, for a train passing from 2 to 12.

On the other hand, relay 4—8⁵R will be energised through a circuit comprising terminal B, front contact 315 of direction-locking relay VSE, front contact 316 of direction-locking relay VSW, front contact 370 of normal indication relay INWP, front contact 371 of press-button relay 4R, front contact 372 of relay 3LR, front contact 373 of relay 5LR, front contact 374 of approach-locking relay 4LS, front contact 375 of approach-locking and press-button repeater relay 8LSP, back contact 376 of relay ILR, winding of relay 4—8⁵R and return wire C.

Should the signalman desire to conduct a train from 4 to 8 over crossover 5 at reverse, he may do so even when switches I are free to be reversed, by first placing switches 5 in their reverse position by the individual control device 5RP; in this case switch locking relay ILR will, of course, be energised, but the pick-up circuit for relay 4—8¹R will be interrupted at back contact 322 of the individual switch control relay 5RWS, while back contact 376 of relay ILR in the pick-up circuit for relay 4—8⁵R will be by-passed by front contact 377 of relay 5RWS.

The operation of the section locking relays will be clear from the illustration in Figure 13, the arrangement being similar to that described in the main patent with the modification that a section-cancelling contact 3A, 5A and 7A has been added so as to allow a route to be established which includes a faulty section.

The control of the direction-detector relays is shown in Figure 11. The operation is similar to that described in French patent app. No. 38,400, which corresponds with the United States Patent No. 2,156,766, issued May 2, 1939, to R. A. McCann, for Railway traffic controlling apparatus. By comparison with Figure 10 of the said patent, it will be seen that two contacts of switch locking relays ILR and 5LR have been added in order to prevent illuminated strips from appearing on the track diagram before the route has actually been established.

The circuits for the approach-locking relays are indicated in Figure 12. The operation is similar to that described in the main patent with reference to Figure 9, with the following modifications: An approach locking auxiliary relay 2AS, 4AS, etc., has been added, the operation of which is not subject to the energisation of associated signal-preparation relays 2HR, 4HR, etc., the energisation circuit of the approach-locking relay LS being substantially unaltered. The object of this modification is to facilitate manoeuvring of a train in the station with the entrance and exit signals at "stop." A repeater relay for the relays LS and R is further preferably employed in complicated layouts in order to reduce the number of contacts in the route circuits. It will thus be found that the repeater relay 8LSP in Figure 12 combines the conditions of the approach locking relay 8LS and of the press button repeater relay 8R with those of signal checking relays 8GP, 8LMP, signal preparation relay 8HR, etc.

Referring now to Figure 10, the following modifications as compared with the system illustrated in Figure 6 of the main patent will be observed:

The correspondence relays NWPP and RWPP which are also repeaters of the route relays, switch locking relays, etc., as described above with reference to Figure 6, are interposed in the signal network circuit, and the approach-locking relays LS are replaced by other approach-locking auxiliary relays AS, the operation of which is, however, as shown in Figure 12, subject to substantially the same conditions as that of the latter, except for the omission of one back contact of the signal-preparation relay HR, these modifications having also for their object to facilitate operations in a station.

Referring now to the illuminated diagram, it will be found from Fig. 19 that at the energisation of the press-button repeater relay 4R, and the direction-selector relay SSE, the signal indicator at location 4 on the panel of Fig. 4 becomes illuminated in red by the lighting of lamp R of indicator 4AK, which has for its object to indicate the beginning of a route selection in order to avoid errors or investigations if the signalman should fail to remember which button he has pressed.

The following further modifications have been made in the circuits for the illumination of the panel:

In Figure 18, which relates to the single route-button system, the interrupter relay CT operating in the manner of a bell, has been replaced by a pulsator device; in Figure 19, which relates to the two-press-button system, the operation is similar to that described with reference to Figure 15 of the main patent and 18 of the present specification, but contacts of the direction-selector relays SSE and SSW and of the press-button relays R have been added, which, however, do not substantially alter the principal ideas of the signal indication or checking circuits, so that no specific description will be required.

Figure 20 only differs from the system illustrated in Figure 16 of the main patent in that an intermittent illumination is utilised for indicating when a track switch is in an intermediate position or during the operation when both the normal and reverse switch indication relays are down, in a manner already described in the specification of the McCann patent hereinbefore referred to. The operation of the intermediate circuits need not be described because it is substantially identical to that described with reference to Figure 16 of the main patent.

The manual cancellation of a route is effected in the same manner as in the UR system, described in French Patent No. 829,857, which corresponds with Letters Patent of the United States, No. 2,244,401, issued June 3, 1941, to J. M. Pelikan, for Railway traffic controlling apparatus, and the operation is the same as that described in the Caille and Laze system, that is to say, in the main patent. In the specification of the main patent will be found a detailed description of what happens when a train passes through the route from 4 to 8 via the crossover 1 at reverse which has been prepared in the manner previously described. The specification of the main patent describes also in detail the establishment of the route portions from 4 to 12 and 12 to 8, and this description is also applicable to the present system.

If it is desired to establish a permanent route in the two-press-button system illustrated in Figure 8, the signalman first establishes the ordinary route, route 2—8, for example, in a manner similar to that described above, and then presses the permanent-route-button 2—8DP (Fig. 4 or Fig. 5) to energise the corresponding permanent route relay 2—8DR, Fig. 8. Owing to the provision of a contact of the permanent-route relay, such as 2—8DR which bridges the front contact of track-repeater relay 1TP, the permanent route when once established will remain so until it is manually cancelled. This manual cancellation may be effected in either of two ways, one consisting in pulling the permanent-route button, and the other in pulling the normal route-entrance button. In the first case the stick circuit of the operated permanent-route relay DR is interrupted so that the latter relay drops, and it will be evident that, no other part of the route control system being affected, the route will be maintained until another train has passed through it. In the second case, however, both the normal route and its permanent maintenance is destroyed so that the route is cancelled at once, as will be evident from Figure 8 of the drawings.

Figure 14 shows the circuits for the cancelling or the rendering ineffective of the track relays for a faulty section, for the single route button system. The general arrangement of the circuits is described with reference to Figure 11 of the main patent, but a normally closed contact of the section-cancelling button 1AP, etc., has been included in the stick circuit of the section cancelling relay 1A, 3A, etc., so as to allow the annulment of the cancellation by pulling the section-cancelling button.

Figure 15 shows a corresponding circuit for a system in which routes are set up by the operation of two route-end buttons. In this case, the back contacts of the route relays 4—8'R, 4—10R, etc., have been replaced by back contacts of the direction-locking relays, in order to permit the stick circuits of the cancelling relays to be interrupted on selection of a route. It should be noticed that the cancelling relays 1A, 3A, etc., when dropping, interrupt the energisation of the switch locking relays LR, Fig. 6, but as mentioned above, the latter are sufficiently delayed to allow setting up of the route.

The call-on operation (see Figure 17) differs from that described with reference to Figure 14 of the main patent in the following respects:

The stick circuit of the call-on relays 6COS or 8COS does not include a front contact of the high-speed-signal checking relay GP, which is also of advantage in view of the above mentioned conditions.

In certain installations it is desirable that one should be able to carry out local switching operations within the section between the entrance and exit signals; for example, a train may pass signal 10, entering the route from 10 to 4, and stop on the track circuit 1T after having cleared the track circuit 3T, and it may be desired to return the train over the switches 5 at reverse in the direction towards signal 8; that is to say, to run through part of the route from 4 to 8 via 5 reversed.

When the train stops on section 7, the route relay 4—10R and the signal-preparation relay 10HR are dropped. As the track circuit 3T is occupied, the signal 10 is kept at stop by the de-energisation of high-speed-signal relay 10BG (Figure 10), and signal-at-stop checking relay 10GP and approach-locking relay 10LS are re-energised (Figures 23 and 12).

When the track circuit 3T is cleared, the direction-detector relay 3WSK is released (Figure 11) and the section locking relay 3WS is re-energised (Figure 13). Switch locking relays 3LR and 5LR are also re-energised (Figure 6) so that the switches 3 and 5 are free to be operated and are in their normal positions.

On the other hand, the track circuit 7T is still occupied, the direction detector relay 7WSK being kept energised through its stick circuit which includes a back contact of track relay 7TR. The section locking relay 7ES is also kept up through a stick circuit comprising a front contact of direction-detector relay 7WSK (Figure 13). The switches 1 are still locked in their normal position owing to the released condition of track-repeater relay 7TP. On the illuminated track diagram the section panels 7K and 1BNK are illuminated in red and all the signal indicators are extinguished under this condition. The signalman presses first button 4P and then button 8P, when the switches 1 are at normal. The energisation of switch indication relay 1NWP will permit the energisation of route relay 4—8⁵R, although switch locking relay 1LR is de-energised (Figure 8) and signal-preparation relay 4HR will also be energised through the same circuit and will energize the direction-detector relay 7ESK (Figure 11).

The route-setting system will remain energised for a sufficient time to permit the operation of switch control relays 3WR and 5WR to the new position (switch control relay 1WR is already in its normal position and is isolated by the fact that switch locking relay 1LR is released). Switch 3 is already at normal and need not be operated.

After its delay period, the approach-locking relay 4LS is released and signal-preparation relay 4HR is also released, since its stick circuit is cut at the back contact 355 of direction-detector relay 7WSK which is energised (Figure 8). The de-energisation of signal-preparation relay 4HR cuts the stick circuit of route relay 4—8⁵R so that the route is cancelled with the points in their correct positions. The release of approach-locking relay 4LS has also cut the energisation circuit of section locking relay 7ES as illustrated in Figure 13, which latter relay in its course has de-energised switch locking relays 3LR and 5LR (Figure 6) as switch indication relay 1RWP is released, switches 1 being at normal, so that switches 3 and 5 are now locked. Approach-locking relay 4LS has confirmed the de-energisation of switch locking relay 1LR. Direction-detector relay 7ESK energises the direction-detector relay 3ESK (Figure 11) which, on its part, energises direction-detector relay 5ESK. On the illuminated track diagram the section panels 7K and 1BNK are still illuminated in red, whereas the release of the signal-preparation relay 4HR extinguishes the red indication of the signal indicator 4K. The route indicating sections 3NK, 3K, 5RK and 5K are illuminated in white. The signal-clearing relay 4DG for the entrance signal is not energised, since track-repeater relay 7TP is released and accordingly the signal 4 is not cleared and protects the train. If the train now goes back and enters the track circuit 3T, a new stick circuit for direction-detector relay 3ESK is prepared through a back contact of relay 3TR (Figure 11), the de-energisation of relays 3LR and 5LR is confirmed by the de-energisation of track-repeater relay 3TP (Figure 6). The section locking relay 3WS is not released because direction-detector relay 3ESK is energised. On the illuminated diagram, the sections 3NK, 3K and 5RK turn from white to red. The train now clears the track circuit 7T, whereupon the direction-detector relays 7WSK and 7ESK are released, the condition being thus the same as if the signal had been passed and the route normally traversed, section locking relay 7ES is energised again (Figure 13), and switch locking relay 1LR is also re-energised (Figure 6), and unlocks the switches 1. On the other hand, switch locking relays 3LR and 5LR remain released, track-repeater relay 3TP is still released and direction-detector relays 3ESK and 5ESK remain energised. On the illuminated diagram, the sections 7K and 1BNK are extinguished. Now the train enters track section 5T, clears track section 3T and finally clears track section 5T, in the usual manner, effecting the sectional release and giving the normal indications on the illuminated track diagram.

Figure 24 shows a modification which has for its object to give protection against bad shuntage of track circuits according to this system, the re-energisation of the track circuits is made subject to a check that no bad shunting has taken place while the track circuit was occupied.

When, for example, track circuit 7T is cleared by an east-bound train, the re-energisation of track-repeater relay 7TP is made subject to a check that direction-detector relay 3ESK is still energised (switches 1 being at normal). If there has been no proper shunting, the route should not be cancelled and the switches should remain locked. If the shuntage takes place (Figure 11), the direction-detector relay 7ESK is kept up through a back contact of track relay 7TR. On the other hand, if, with the switches 1 at normal, there is a faulty shuntage before section 3 is entered, the direction-detector relay 7ESK is released and causes the release of direction-detector relay 3ESK. It will be seen from Figure 24 that, if zone 7T is cleared with direction-detector relay 3ESK in its release position, the track repeater relay 7TP will not be re-energized.

After the passage of a train, normal conditions may be re-established by cancelling section 7T by means of the section-cancelling button 7AP. It will be noticed that track-repeater relay 7TP locks the track switches concerned, and accordingly in the present example, switches 1, 3 and 5 will be kept locked by the de-energisation of track repeater relay 7TP.

In station layouts in which non-continuous track circuits are employed, the arrangement shown in Figures 25, 25A, 25B and 25C may be usefully employed. In this system there are two track circuits, 2T and 4T, at the entrance and exit of the station, while the intermediate section of track does not form part of a track circuit. The system operates in the following manner:

When the route relay and signal-preparation relay such as 2—4R and 2HR are energised (Figure 25A), for example by a route-control-button 2—4P as in the system of the main patent, a passage-storing relay 4EPS is de-energized and cuts the energisation circuit of a locking relay 4LR, the principal object of which is to de-energize a switch locking relay ILR as illustrated in Figure 25C. When the train enters the layout in the east-bound direction, the track relay 2TR at the entrance will be released and cut a stick circuit of route and signal relays 2—4R and 2HR (the corresponding circuits being not illustrated as they are identical with those of the main patent), and the entrance signal will be put to "stop." The switches I are still locked, since the locking relay 4LR is still released. The train then clears section 2T and traverses the section which is not provided with a track circuit and in which the track switches are located. Finally it will reach and enter the section 4T, thus re-energising the passage-storing relay 4EPS through a circuit including terminal B, back contact of route relay 2—4R, back contact of track relay 4TR, winding of passage-storing relay 4EPS and terminal C. Switches I are, however, still locked, since locking relay 4LR is kept released owing to the fact that track relay 4TR is released. When finally the train clears section 4T, track relay 4TR is re-energised and completes the circuit for the energisation of locking relay 4LR from terminal B through back contact of signal relay 2HR, front contact of passage storing relay 4EPS, front contact of track relay 4TR, winding of relay 4LR to terminal C. Both locking relays 2LR and 4LR being now energised, switch locking relay LRI will also be energised, as will be obvious from Figure 25C.

It will be evident that although only a very simple layout has been described, this feature may correspondingly be applied to the arrangements in an important station.

In general, numerous modifications of detail may be made in the systems described with reference to the accompanying drawings without departing from the spirit or scope of the present invention. More particluarly it is pointed out that the very limited number of line wires in systems according to the present invention, both in the single-button and entrance-exit systems, permits the transfer of control arrangements by means of a suitable change-over switch to a protected safety position. This may be important as an air raid precaution, since the relays may then be accommodated in a protected position in a suitable underground or other shelter.

Having thus described my invention, what I claim is:

1. In an interlocking control system for a track layout including track switches operable to form different traffic routes, route buttons for selecting said routes, a route circuit for each route each closed in response to the operation of one or more route buttons identifying the corresponding route, route relays initially energised over said route circuits and arranged to be held energised independently of the operated route buttons until cancelled, for establishing said routes, and timing means effective to interrupt said route circuits in the event said buttons are held operated for a predetermined period.

2. In an interlocking control system for a track layout including track switches operable to form different traffic routes, route buttons for selecting said routes, a route circuit for each route each closed in response to the operation of one or more route buttons identifying the corresponding route, route relays initially energised over said route circuits and arranged to be held energised independently of the operated route buttons until cancelled, for establishing said routes, contacts controlled by conflicting route relays included in said route circuits to prevent the energisation of route relays for non-available routes, and timing means rendering each route circuit responsive to the operation of the corresponding button for a predetermined period only following the operation of such button.

3. In an interlocking control system for a track layout including track switches operable to form different traffic routes, an individual route button for each route, each provided with a plurality of movable contacts, a plurality of electrically interlocked route relays for controlling the track switches as required to establish said different routes, a normally energised slow release relay, a circuit for said slow release relay including normally closed contacts of all said route buttons, an energising circuit for each route relay including a normally open contact of an associated route button and a front contact of said slow release relay, and a holding circuit for each route relay including a normally closed manually operable contact.

4. In an interlocking control system for a track layout including track switches operable to form different traffic routes, a route button for each route end at each end of said layout, two slow release directional relays, one for each end of the layout, a circuit closed in response to the operation of the first of two buttons associated with opposite ends of a desired route through said layout for energising the slow release relay for the corresponding end of the layout, route relay means for each route effective when energised to establish the corresponding route through said layout, means for opening the circuit for said energized slow release relay in response to a subsequent operation of the second of said two buttons and at the same time completing a selected circuit controlled jointly by said two buttons for energising the route relay means for the desired route only as long as said slow release relay remains picked up and only if such route is then available, and means independent of said route buttons for maintaining the selected route relay means energised to maintain the corresponding route established until cancelled.

5. In combination, a track layout including track switches operable to form different traffic routes, two slow release directional relays, one for each end of the layout, a route button for each route end, a repeater relay for each button having a pick-up circuit closed whenever such button is operated, a circuit closed when the repeater relay for the first of two buttons associated with opposite ends of a desired route through said layout is picked up, to energise the directional relay for the same end of the layout, a stick circuit for each repeater relay closed when that relay is picked up as long as either directional relay is picked up, electroresponsive route establishing means for each route, means effective when the repeating relay for the second of said two buttons to be operated is picked up to open the circuit for said energised directional relay, and a route circuit controlled jointly by said two repeating relays closed during the release period of said directional relay for energising the route establishing means for the corresponding route to establish that route.

6. In combination, a track layout including track switches operable to form different traffic routes with signals at the entrances to said routes at each end of said layout, two slow release directional relays, one for each end of the layout, a route button for each signal location, a circuit closed in response to the operation of the first of two buttons associated with signal locations at opposite ends of a desired route through said layout, for energising the directional relay for the corresponding end of the layout, route relays for said routes, signal control relays for said signals, a route circuit controlled jointly by said two buttons and closed in response to the operation of the second of said two buttons to be operated for energising the route relay for the desired route, a circuit for energising the signal control relay for the signal at the end of said route with which said first operated button is associated, said circuit being prepared by said energised directional relay and completed by said energised route relay, and circuits controlled by said energised route relay for operating the track switches as required to establish the corresponding route and for clearing the signal governed by said energised signal control relay when said route is established.

7. In combination, a track layout including track switches operable to form different traffic routes, two slow release directional relays, one for each end of the layout, a direction locking relay for each slow release relay, a route button for each route end, at each end of said layout, a circuit closed in response to the operation of the first of two buttons associated with opposite ends of a desired traffic route through said layout for energising the directional relay for the corresponding end of the track layout, said circuit including a back contact of the associated direction locking relay, a circuit for each direction locking relay closed in response to the operation of any button for a route end at the opposite end of the layout, route relay means for each route effective when energised to establish the corresponding route, a route circuit controlled jointly by said two buttons and closed in response to the operation of the second of said two buttons to be operated for momentarily energising the route relay means for the corresponding route provided such route is then available, and means independent of said two buttons for holding said route relay means energised to maintain the corresponding route established until cancelled.

8. In combination, a track layout including track switches operaple to form different traffic routes, two slow release directional relays one for each end of the layout, a direction locking relay for each slow release relay, a route button for each route end at each end of said layout, a circuit closed in response to the operation of the first of two buttons associated with opposite ends of a traffic route through said layout for energising the directional relay for the corresponding end of the track layout, said circuit including a back contact of the associated direction locking relay, a circuit for each direction locking relay closed in response to the operation of any button for a route end at the opposite end of the layout, route relay means for each route effective when energised to establish the corresponding route, a route circuit controlled jointly by said two buttons including front contacts of both direction locking relays and closed in response to the operation of the second of said two buttons to be operated for momentarily energising the route relay means for the corresponding route provided such route is then available, and means independent of such buttons for holding such route relay means energised to maintain the corresponding route established until cancelled.

9. In an interlocking control system, a track layout including track switches operable to form different traffic routes with signals at the entrances to said routes at each end of the layout, a route button for each signal location, a directional relay for each end of the layout, a circuit for energising each directional relay closed for a brief interval only in response to the successive operation of two buttons for signal locations at opposite ends of a desired traffic route through said layout, one directional relay or the other being selectively energised dependent upon the relative order in which such buttons are operated, route relay means controlled by said two buttons irrespective of their order of operation for establishing the desired said traffic route, circuits controlled by the selected directional relay when energised for preparing a circuit for the signal at the corresponding end of such route, and means comprising contacts controlled by the track switches for completing the prepared circuit to clear said signal when said route is established.

10. In an interlocking control system, a track layout including a plurality of track sections interconnected by track switches to form different traffic routes, with signals at the entrances to the routes at each end of the layout, a track relay for each track section, a route button for each signal location, route relay means for each route responsive to the joint operation of the two buttons for signal locations at opposite ends of the route for establishing the route from one of said signal locations to the other and for clearing the signal at a selected end of said route, means responsive to the release of the track relay for the section of said route adjacent said signal for releasing said route relay means to cancel the route, permanent route relays for certain of said routes each having a manually controlled pick-up and stick circuit adapted to be energised only when the route control means for the corresponding route is already energised, and means controlled by each permanent route relay when energised for maintaining the corresponding route relay means energised with the signal controlled thereby held at clear until such permanent route relay is released manually.

11. In combination, a track layout including track switches operable to form different traffic routes, a control panel including a miniature track diagram corresponding to said track layout, a route button for each route end at each end of said track layout mounted on said diagram in a corresponding location, two slow release relays, one for each end of said layout, a direction indicator for each slow release relay located on said control panel, a circuit closed in response to the operation of the first of two buttons associated with opposite ends of a route through said layout for energising the slow release relay for the corresponding end of the layout, a lamp having a circuit controlled by front contacts of said slow release relay for illuminating the corresponding direction indicator, route establishing means for each route, a route circuit including a contact closed in response to the operation of the second of said two buttons for energising the route establishing means for the corresponding route, said circuit also including contacts which are open in the event a conflicting route is already established and other contacts which open upon the release of said energised slow release relay, and means responsive to the operation of said second button for opening the circuit for said energised slow release relay irrespective of whether or not said route establishing means becomes energised.

12. In combination, a track layout including track switches operable to form different traffic routes, two directional relays, one for each end of the layout, a control panel comprising a miniature representation of said layout, a route button for each route end mounted on said panel in a corresponding location, a repeater relay for each button responsive to the momentary operation thereof, a circuit for each directional relay closed upon energisation of any repeater relay associated with the same end of the layout and opened in response to the subsequent energisation of any repeating relay associated with the other end of the layout, a stick circuit for each repeater relay closed when that relay is picked up and held closed as long as either directional relay is energised, an illuminated direction indicator or said panel for each directional relay arranged to be lighted as long as such directional relay is picked up, route establishing means for each route, and a route circuit controlled jointly by the repeating relays for the two buttons for the opposite ends of a route for energising the route establishing means for the corresponding route to establish that route.

13. In an interlocking control system, a power operated track switch, signals for governing traffic movements over the switch in its normal and reverse positions, respectively, manually controllable switch control means, a switch locking relay controlled by traffic conditions, circuits for operating the switch control means to normal or reverse to thereby operate the track switch to a corresponding position, said switch control means being manually controllable only when said locking relay is energised, means for holding said switch control means in its last operated position to lock the track switch in a corresponding position as long as said locking relay is in its deenergised position, normal and reverse indication means controlled by the switch for indicating its position, a normal and a reverse correspondence relay each having a circuit including a back contact of said locking relay and closed only when the switch indication and control means both occupy a corresponding normal or reverse position, respectively, and the track switch is locked in such position with said locking relay deenergised, manually controllable signal control means for each signal, means responsive to the operation of each signal control means for deenergising said switch locking relay, and a circuit for each signal prepared upon operation of the associated signal control means and completed by said normal or reverse correspondence relay when the switch assumes a position corresponding to the position of said switch control means.

14. In an interlocking control system, a track layout including track switches operable to form different traffic routes with signals for governing traffic movements over said routes, a switch control relay for each switch, manually controllable route establishing means for each route, a locking relay for each switch controlled by traffic conditions and effective when deenergised to prevent the operation of that switch from its last operated position to a different position, circuit means responsive to the operation of the route establishing means for any given route for operating the switch control relay for each switch of the route to normal reverse to effect the operation of that switch to the corresponding normal or reverse position as required for that route and for then releasing the locking relay for each switch of the route to thereby lock each such switch in its last operated position as long as that route is established, a normal and a reverse correspondence relay for each switch, a circuit for each normal or reverse correspondence relay completed by the associated track switch only when it is locked in the position required for a given route with the corresponding switch control relay energised and the associated locking relay deenergised, and a circuit for clearing the signal at the entrance to said given route prepared by the route establishing means for that route and completed upon the energisation of the normal or reverse correspondence relay for each switch of the route.

15. In an interlocking control system for a railway track layout including a track switch with two opposing signals, one at each end of a traffic route over the switch, said control system including a route button for each end of said route, a normally closed manually operable cancelling contact and a signal control relay for each signal, together with an approach locking relay for each signal energised only when such signal is at stop, the combination of pick-up circuits controlled jointly by said route buttons including front contacts of both said approach locking relays for energising one signal control relay or the other dependent upon the relative order of operation of said buttons to clear the corresponding signal when the track switch occupies the position required for said route, with a stick circuit for each signal control relay including a back contact of the associated approach locking relay and the corresponding manually operable cancelling contact.

16. In a railway signalling system, a stretch of track including a track section provided with a track relay adapted to be shunted by a train passing over said track section, the combination of means for detecting the continuity of the shunt due to a train in said section comprising a direction detector relay, a pick-up circuit for said direction detector relay closed when a train movement over said section is to be effected and opened upon the release of said track relay, a stick circuit for said direction detector relay including its own front contact and a back contact of said track relay, a slow acting track repeater relay, a pick-up circuit for said slow acting relay including a front contact of said track relay and a contact which opens in response to the release of said direction detector relay before said slow acting relay has time to pick up in the event said track relay becomes energised when a portion of said stretch adjoining said track section is not occupied by a train, and a stick circuit for said slow acting relay including its own front contact and a front contact of said track relay.

17. In an interlocking control system for a track layout including a plurality of track switches adapted to be arranged to form different traffic routes with signals for governing traffic movements over said routes in opposite directions, said track layout comprising insulated track sections at each end and tracks not provided with track circuits between the insulated sections, the combination with route buttons for selecting the routes, route control apparatus responsive to the operation of said buttons for establishing selected routes and for clearing the signals at the entrances to said routes in accordance with the desired direction of traffic movement, of passage storage relays which are arranged to be deenergised by the setting up of a route and to be energised again by the successive occupancy by a train in an order corresponding to said desired direction, of the insulated track sections at the two ends of such route, together with circuit means for preventing the operation of any switch of a route in response to the operation of the said route buttons as long as the corresponding passage storage relay is deenergised.

GEORGES LOUIS CAILLE.